(12) United States Patent
DeFelice et al.

(10) Patent No.: US 11,053,949 B2
(45) Date of Patent: Jul. 6, 2021

(54) PASSIVELY CONTROLLED INLINE BLEED VALVES

(71) Applicant: Hamilton Sundstrand Corporation, Charlotte, NC (US)

(72) Inventors: Robert DeFelice, South Windsor, CT (US); David J. Zawilinski, W. Granby, CT (US); Scott W. Simpson, Easthampton, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 231 days.

(21) Appl. No.: 16/054,889

(22) Filed: Aug. 3, 2018

(65) Prior Publication Data

US 2020/0040902 A1    Feb. 6, 2020

(51) Int. Cl.
*F02C 6/08* (2006.01)
*F04D 27/02* (2006.01)
*F01D 17/10* (2006.01)
*F01D 17/14* (2006.01)
*F02C 9/18* (2006.01)

(52) U.S. Cl.
CPC ....... *F04D 27/0215* (2013.01); *F01D 17/105* (2013.01); *F01D 17/145* (2013.01); *F02C 9/18* (2013.01); *F04D 27/023* (2013.01); *F02C 6/08* (2013.01)

(58) Field of Classification Search
CPC ... Y10T 137/3367; Y10T 37/353; F16K 1/12; F16K 1/126; F16K 15/026; F02C 6/08
See application file for complete search history.

(56) References Cited

U.S. PATENT DOCUMENTS 1,636,662 A * 7/1927 Larner .................... F16K 1/126
                                                            137/222
4,182,117 A * 1/1980 Exley ....................... F02C 6/08
                                                            415/208.3
(Continued)

FOREIGN PATENT DOCUMENTS

EP    3056739 A1    8/2016
EP    3070336 A1    9/2016
GB    2376515 A    12/2002

OTHER PUBLICATIONS

Extended European Search Report dated Jan. 8, 2020, issued during the prosecution of European Patent Application No. EP 19189050.8.

*Primary Examiner* — Gerald L Sung
(74) *Attorney, Agent, or Firm* — Locke Lord LLP; Joshua L. Jones; Scott D. Wofsy

(57) ABSTRACT

A bleed valve includes a housing with an inlet coupled to an outlet by a duct. A guide tube is fixed within the housing between the inlet and the outlet. A piston with a piston orifice is slideably supported on the guide tube and movable between an open position and a closed position. The duct fluidly couples the inlet to the outlet in the open position, the duct fluidly separates the inlet from the outlet in the closed position, and the piston orifice fluidly couples the inlet with the outlet in the open position and the closed position to move piston between the open position and the closed position according to differential in pressure between the inlet and the outlet of the bleed valve. Compressors, gas turbine engines, and methods of controlling fluid flow are also described.

19 Claims, 6 Drawing Sheets

(56) References Cited

U.S. PATENT DOCUMENTS

| | | |
|---|---|---|
| 5,531,566 A | 7/1996 | Derouet et al. |
| 6,102,017 A | 8/2000 | Bushell |
| 7,086,841 B2 | 8/2006 | Cornwell |
| 7,555,905 B2 | 7/2009 | Borcea |
| 8,814,498 B2 | 8/2014 | Goodman et al. |
| 9,784,184 B2 | 10/2017 | Marocchini et al. |
| 2004/0261858 A1* | 12/2004 | Ferrel ............... F16K 24/02 137/493.8 |
| 2009/0056307 A1* | 3/2009 | Mons ............... F01D 17/141 60/226.3 |
| 2016/0273450 A1* | 9/2016 | Marocchini ............ F02C 6/08 |
| 2017/0191373 A1 | 7/2017 | Miranda et al. |

* cited by examiner

PASSIVELY CONTROLLED INLINE BLEED VALVES

FEDERAL RESEARCH STATEMENT

This invention was made with government support with the United States Air Force under Contract No. FA8626-16-C-2139. The government has certain rights in the invention.

BACKGROUND OF THE INVENTION

1. Field of the Invention

The present disclosure relates to valves, and more particularly to bleed valves and methods of controlling fluid flow through bleed valves, such as in gas turbine engines.

2. Description of Related Art

Gas turbine engines commonly employ compressors. The compressor provides a flow of compressed fluid to combine with fuel for high pressure combustion products. The high pressure combustion products are typically provided to a turbine, which expands the combustion produces to generate work to power the compressor, engine accessories, and to generate thrust.

During engine starting the supply of high pressure combustion products is limited and can be insufficient to power the compressor. Therefore, for purposes of limiting the work input requirement of the compressor during starting, the compressor may be vented. Venting is typically accomplished by opening a bleed valve to allow a portion of the fluid flowing through the compressor to exit the compressor gas path to limit the amount of necessary to compress fluid ingested by the compressor. Operation of bleed valves is generally accomplished actively, such as with a solenoid or with a flow of pressurized provided to the bleed valve.

Such conventional methods and systems have generally been considered satisfactory for their intended purpose. However, there is still a need in the art for improved bleed valves, compressors, gas turbine engines, and methods of controlling fluid flow through a bleed valve. The present disclosure provides a solution for this need.

SUMMARY OF THE INVENTION

A bleed valve includes a housing with an inlet coupled to an outlet by a duct. A guide tube is fixed within the housing between the inlet and the outlet. A piston with a piston orifice is slideably supported on the guide tube and movable between an open position and a closed position. The duct fluidly couples the inlet to the outlet in the open position, the duct fluidly separates the inlet from the outlet in the closed position, and the piston orifice fluidly couples the inlet with the outlet in the open position and the closed position to move piston between the open position and the closed position according to differential in pressure between the inlet and the outlet of the bleed valve.

In certain embodiments the piston can have a face portion and a skirt portion. The face portion can oppose the inlet. The skirt portion can extend from the face portion and towards the outlet. The piston orifice can extending through the piston face portion to fluidly couple the inlet to the outlet. The piston orifice can have a flow area that is smaller than a flow area of the inlet. The piston orifice flow area can be smaller than a flow area of the outlet. The piston orifice flow area can be smaller than flow areas of both the inlet and the outlet. The inlet and/or the outlet can have flow area greater than the piston orifice flow area an order of magnitude or greater.

In accordance with certain embodiments the guide tube can have a guide tube orifice. The guide tube orifice can be in fluid communication with the piston orifice. The guide tube orifice can be in fluid communication with the outlet when the piston is in both the open and closed positions. The guide tube orifice can be in fluid communication with the inlet when the piston is in both the open and closed positions. The guide tube orifice can have a flow area that is smaller than a flow area of the inlet, the outlet, or both the inlet and the outlet. Either or both the inlet and the outlet can have flow area greater than that of the guide tube orifice by an order of magnitude or greater.

It is contemplated that the bleed valve can include a biasing member. The biasing member can be seated between the housing and the piston. The biasing member can be arranged to bias the piston towards the inlet of the housing. The housing can include an inlet portion and an outlet portion. The inlet portion can define the inlet, the outlet portion can defining the outlet, and the outlet portion can be sealably connected to the outlet portion.

It is also contemplated that the housing can have an open seat and a closed seat. The piston can seat against the open seat in the open position. The piston can seat against the closed seat in the closed position. An inner sealing ring can be disposed between the piston and the housing. The inner sealing ring can be arranged between the guide tube and the piston. An outer sealing ring can be disposed between the housing and the piston. The outer sealing ring can be arranged on a side of the piston opposite the guide tube.

A compressor include a plenum and a bleed valve as described above. The bleed valve housing is arranged in series between the plenum and the external environment such that differential pressure between the plenum and the bleed valve outlet passively controls movement of the piston between the open position and the outlet position.

A gas turbine engine includes a compressor with a plenum, a turbine operably connected to the compressor, and a bleed valve as described above. The bleed valve couples the plenum with the external environment. The flow area of the piston orifice is smaller than flow areas of the inlet and the outlet such that the piston remains in the open position during engine starting and remains in the closed position during engine steady state operation.

A method of controlling fluid flow through a bleed valve includes, at a bleed valve as described above, fluidly coupling the inlet to the outlet with the duct by moving the piston to the open position to fluidly separating the inlet from the outlet by moving the piston to the closed position. The inlet is in fluid communication with the outlet through the piston orifice when the piston is in the both open and closed positions.

In certain embodiments the method can include passively moving the piston to the closed position when differential in pressure between the inlet and the outlet (differential pressure) exceeds a predetermined value. The piston can be passively moved to the open position when differential in pressure between the inlet and the outlet is below a predetermined value. Fluid can flow through the through the bleed valve with the piston in the closed position.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
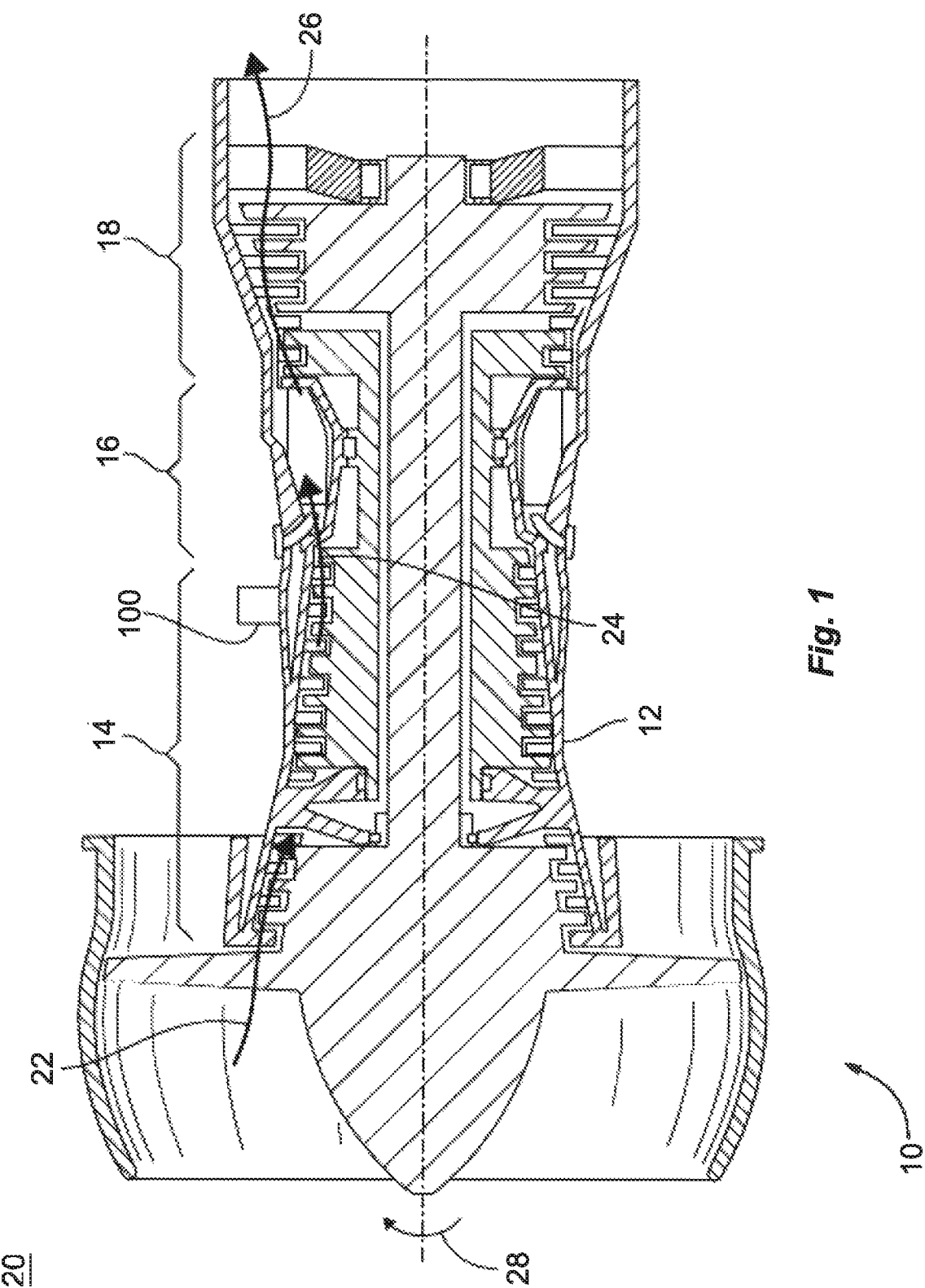
FIG. 1 is a schematic view of a gas turbine engine with a passively controlled inline bleed valve constructed in accordance with the present disclosure, showing the bleed valve fluidly coupling the gas turbine compressor to the external environment.

Reference will now be made to the drawings wherein like reference numerals identify similar structural features or aspects of the subject disclosure. For purposes of explanation and illustration, and not limitation, a partial view of an exemplary embodiment of a bleed valve in accordance with the disclosure is shown in FIG. 1 and is designated generally by reference character 100. Other embodiments of bleed valves, compressors, gas turbine engines, and methods a controlling fluid flow through bleed valves in accordance with the disclosure, or aspects thereof, are provided in FIGS. 2-6, as will be described. The systems and methods described herein can be used for passively controlling inline bleed valves in gas turbine engines, though the present disclosure is not limited to gas turbine engines.

Referring to FIG. 1, a gas turbine engine 10 is shown. Gas turbine engine 10 includes case 12 containing a compressor section 14, a combustion section 16, and a turbine section 18. Compressor section 14 is disposed in fluid communication with external environment 20 and is arranged to compress fluid 22 ingested from external environment 20. Once compressed compressor section 14 communicates fluid 22 to combustion section 16 as a compressed fluid 24.

Combustion section 16 is disposed in fluid communication with compressor section 14 and is arranged to receive therefrom compressed fluid 24. Combustion section 16 generates high pressure combustion products 26 using compressed fluid 24 and fuel provided to combustion section 16. Combustion section 16 communicates high pressure combustion products 26 to turbine section 18.

Turbine section 18 is disposed in fluid communication with combustion section 16 and is arranged to receive therefrom high pressure combustion products 26. The high pressure combustion products 26 are expanded by turbine section 18 as high pressure combustion products 26 traverse turbine section 18, turbine section 18 extracting work 28 from high pressure combustion products 26 during expansion. A portion of work 28 is provided to compressor section 14 to provide the input power necessary to compress fluid 22 for generating compressed fluid 24, the amount of work corresponding the amount of fluid and extent of compression required for the operating state of gas turbine engine 10. Bleed valve 100 is connected to case 12 for reducing amount of work 28 provided to compressor section 14 according to the operating regime of gas turbine engine 10, such as during engine starting.

Figure 2:
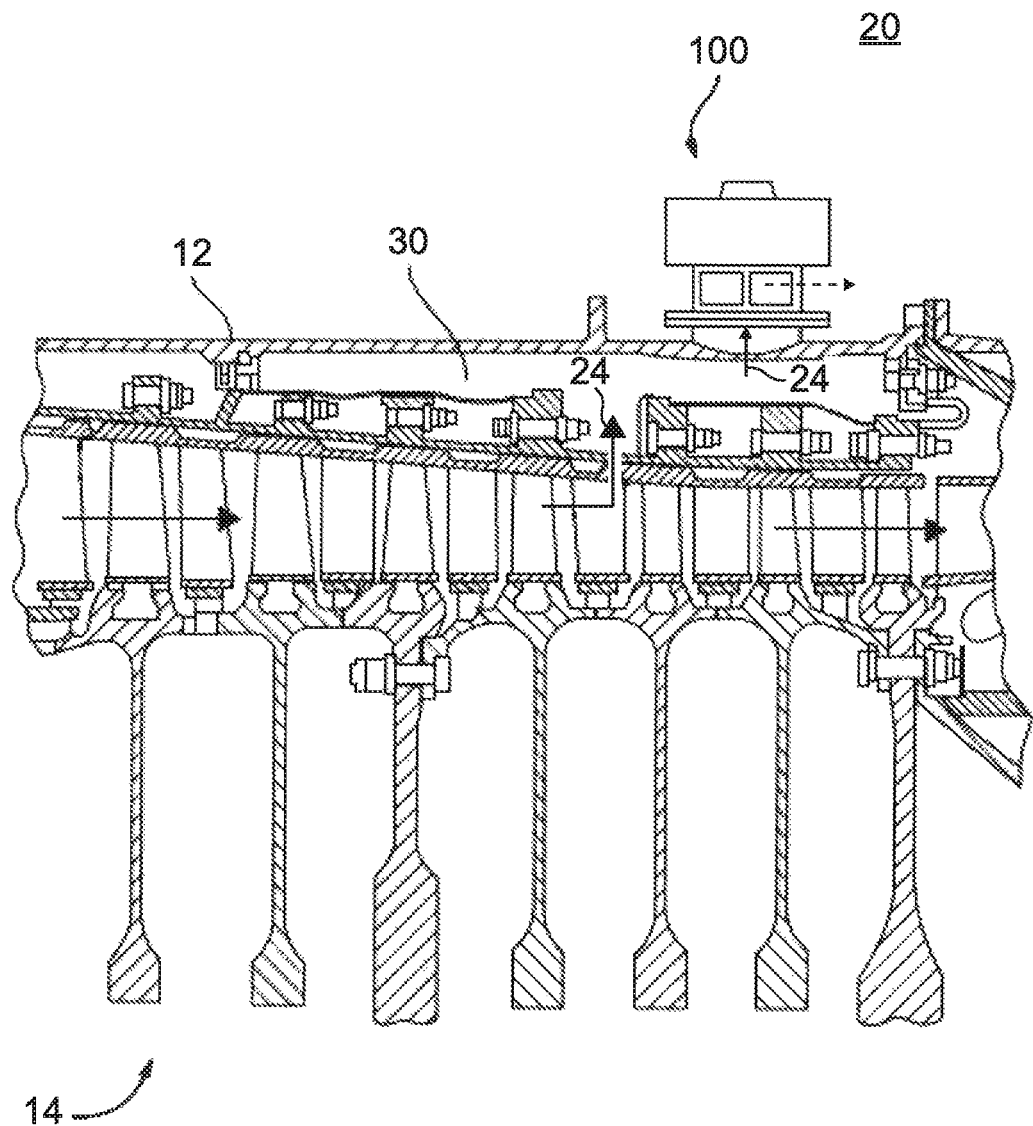
FIG. 2 is a schematic view of a bleed valve of FIG. 1, showing the bleed valve passively controlled to fluidly couple and fluidly separate a plenum of the gas turbine engine compressor with the external environment according to pressure differential between an inlet and an outlet of the bleed valve.
Figure 3A:
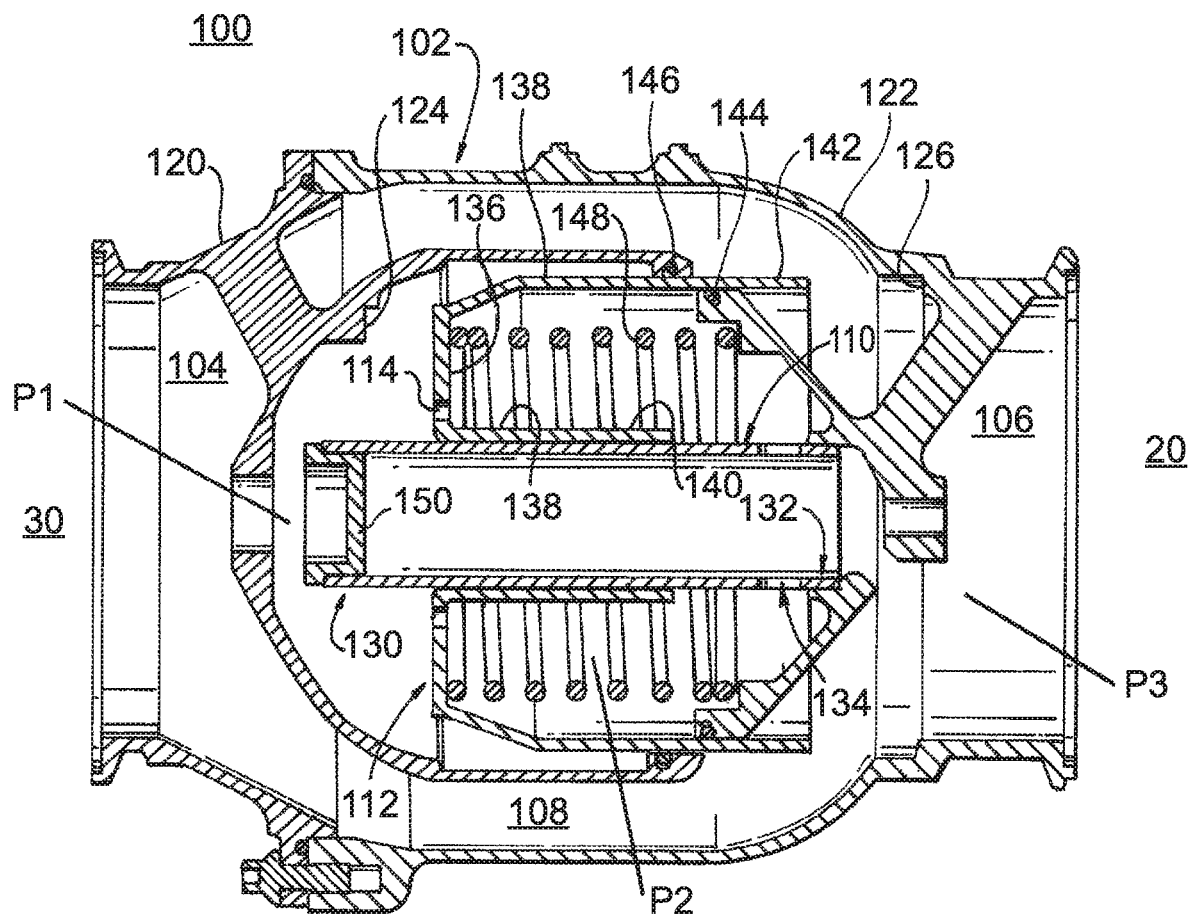
FIGS. 3A-3C are a view of the bleed valve and flow areas of the bleed valve of FIG. 1, showing valve elements and relative flow areas of the valve inlet and outlet to the orifices.

With reference to FIGS. 2 and 3A, compressor section 14 is shown. Compressor section 14 includes a plenum 30 which is in fluid communication with compressor section 14 and is occupied by compressed fluid 24. An inlet 104 (shown in FIG. 3A) of bleed valve 100 is in fluid communication with plenum 30 such that a pressure differential P1-P3 (shown in FIG. 3A) exists across inlet 104 and an outlet 106 (shown in FIG. 3A) of bleed valve 100, e.g., a pressure differential between compressed fluid 24 and pressure of external environment 20. Bleed valve 100 opens and closes according to pressure differential P1-P3 passively, i.e., without the assistance of a solenoid of muscle force provided by a flow of compressed fluid, such that a portion of compressed fluid flows from within case 12 to the external environment 20.

Referring to FIG. 3A, bleed valve 100 is shown. Bleed valve 100 includes a housing 102 with inlet 104, outlet 106, and duct 108 coupling inlet 104 to outlet 106. A guide tube 110 is fixed within housing 102 between inlet 104 and outlet 106. Piston 112 with piston orifice 114 is slideably supported on guide tube 110 and is movable between open position 116 (shown in FIG. 4) and closed position 118 (shown in FIG. 4). It is contemplated that duct 108 duct fluidly couple inlet 104 to outlet 106 in when piston 112 is open position 116 and that duct 108 fluidly separate inlet 104 from outlet 106 when piston 112 is in closed position 118. Piston orifice 114 fluidly couples inlet 104 with outlet 106 when piston 112 is in both open position 116 and closed position 118. Outlet 104 of bleed valve 100 goes to bypass 108 to combine with fluid therein.

Housing 102 has an inlet portion 120 and an outlet portion 122. Inlet portion 120 defines inlet 104, is sealably connected to outlet portion 122 on an end opposite of inlet portion 120 opposite (relative to a direction of flow through bleed valve 100) inlet 104, and has an open seat 124 arranged within an interior of inlet portion 120. Open seat 124 is configured to receive piston 112 when piston 112 is in open position 116 (shown in FIG. 4). Outlet portion 122 defines outlet 106 and fastens to inlet portion 120 on an end of outlet portion 122 opposite (relative to a direction of flow through bleed valve 100) inlet 104. A closed seat 126 is arranged with an interior of outlet portion 122 to receive piston 112 when piston 112 is in closed position 118 (shown in FIG. 5). Connection of inlet portion 120 to outlet portion 122 can be with threaded fasteners by way of non-limiting example.

Guide tube 110 is fixed within housing 102. As shown in FIG. 3A guide tube 110 extends axially between inlet 104 and outlet 106 and has an inlet end 130, an outlet end 132, and a guide tube orifice 134. Outlet end 132 is seated in outlet portion 122 of housing 102. Guide tube orifice 134 is defined within guide tube 110 at a location between outlet end 132 and inlet end 104 and extends through a thickness of the wall defining guide tube 110. Inlet end 130 opposes inlet 104 on a side of guide tube orifice 134 opposite outlet end 132. An end cap 150 is seated on guide tube 110 facing inlet 104. As shown in FIG. 3A guide tube orifice 134 is one of plurality of guide tube orifices defined through the guide tube wall, guide tube orifice 134 and piston orifice 114 defining an orifice network within bleed valve 100.

Piston 112 is slidably seated on guide tube 110 and has a face 136 and a skirt 138. Piston face 136 opposes inlet 104. Piston skirt 138 extends from piston face 136 towards outlet 106 and includes an inner portion 140 and an outer portion 142. Inner portion 140 extends about guide tube 110 and is in sliding engagement with an outer surface of guide tube 110. Outer portion 142 extends about inner portion 140 is sealably received between inlet portion 120 and outlet portion 122 of housing 102. Piston orifice 114 is extends through piston face 136 to fluidly couple inlet 104 with a volume defined at a location of piston face 136 between inner portion 140 and outer portion 142 of piston skirt 138. As shown in FIG. 3A, an inner sealing member 144 is seated within outer portion 122 of housing 102, extends about guide tube 110, and abuts an inner surface of outer portion 142 to prevent fluid flow therebetween. An outer sealing member 146 is seated within inlet portion 120 of housing 102, extends about skirt outer portion 142, and abuts an outer surface of skirt outer portion 142 to similarly prevent fluid flow therebetween.

A biasing member 148 is arranged between piston 112 and housing 102. Biasing member 148 is arranged to exert a biasing force B (shown in FIG. 4) on piston 112, biasing force B urging piston 112 in the direction of inlet 104 and toward open seat 124. It is contemplated that biasing force B cooperate with an chamber pressure force C (shown in FIG. 4) exerted on piston 112 from pressure of fluid between inner portion 140 and outer portion 142 of piston 112 to oppose a plenum fluid force P (shown in FIG. 4) exerted on piston 112 by compressed fluid 24 (shown in FIG. 1) at inlet 104. Location of piston 112 within housing 102, e.g., open position 116 (shown in FIG. 4) and closed position 118 (shown in FIG. 5), is governed by equilibrium between biasing force B, chamber force C, and plenum fluid force P. As shown in FIG. 3 biasing member 148 includes a spring element arranged between an inner surface of piston face 136 and outlet portion 122 of housing 102. As will be appreciated by those of skill in the art in view of the present disclosure, other spring element arrangements and/or types of biasing elements can be used and remain within the scope of the present disclosure, as suitable for an intended application.

Figure 4:
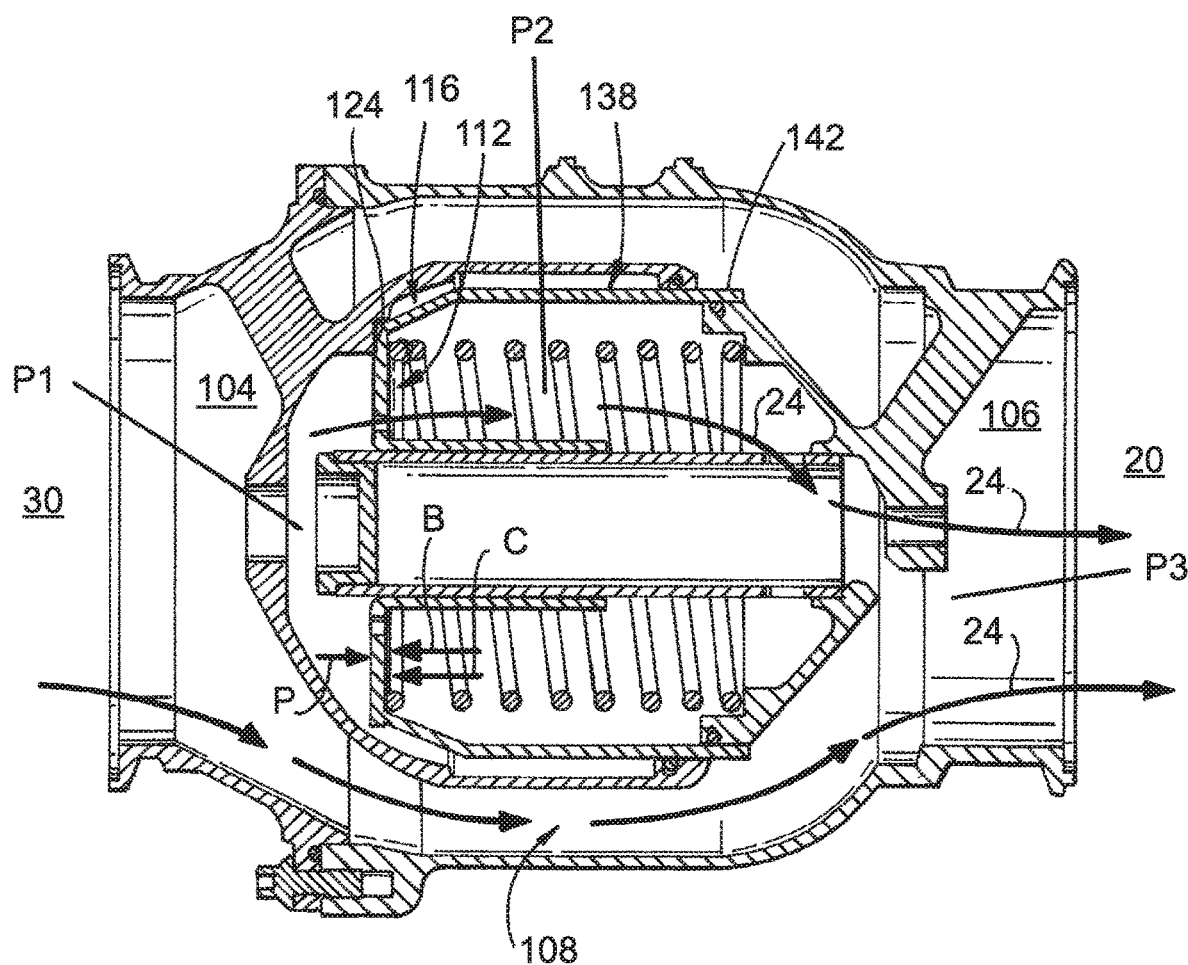
FIG. 4 is a cross-sectional view of the bleed valve of FIG. 1, showing the piston disposed at an open position such that the bleed valve inlet and outlet fluidly communicate with one another through a duct bypassing the piston.

Referring to FIG. 4, piston 112 is shown in open position 116. In open position 116 piston 112 abuts open seat 124. Movement of piston 112 to open position 116 such that piston 112 abuts against open seat 124 withdraws piston skirt 138, and more particularly outer portion 142 of piston skirt 138, from duct 108. Withdrawal of piston skirt 138 from duct 108 causes duct 108 to fluidly couple inlet 104 with outlet 106, compressed fluid 24 (shown in FIG. 1) thereby flowing through duct 108 such that compressed fluid 24 flows through bleed valve 100. Piston 112 remains in abutment with open seat 124 while differential pressure P1-P3 across bleed valve 100, i.e., differential between pressure P1 at inlet 104 and pressure P3 at outlet 106, remains below the predetermined value. When differential pressure across bleed valve 100 exceeds the predetermined value piston 112 moves to closed position 118 (shown in FIG. 5).

Figure 5:
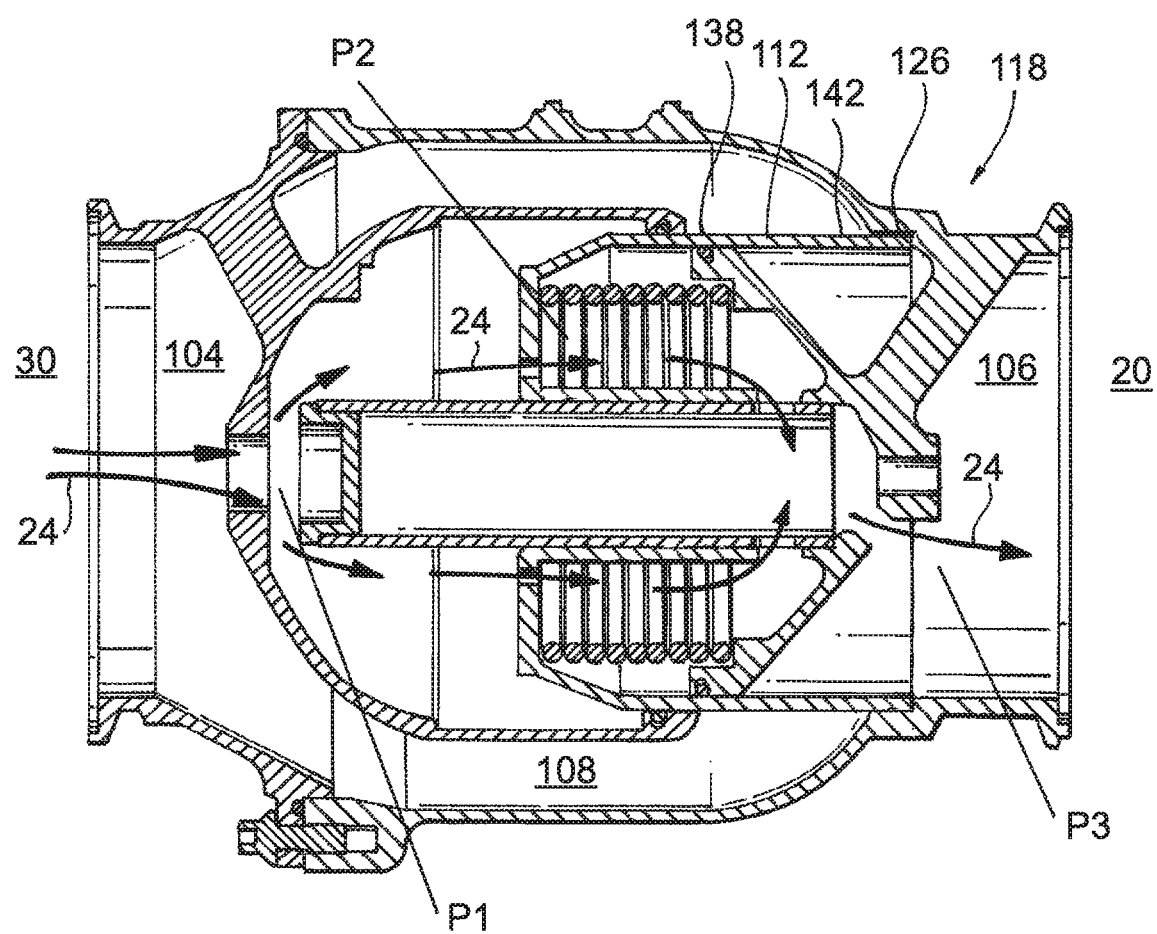
FIG. 5 is a schematic view of the bleed valve of FIG. 1, showing the piston disposed at an closed position such that the duct fluidly separates the bled valve inlet from the outlet.

Referring to FIG. 5, piston 112 is shown in closed position 118. In closed position 118 piston abuts closed seat 126. Movement of piston 112 to closed position 118 such that piston 112 abuts closed seat 126, and more particularly such that outer portion 142 abuts closed seat 126, inserts skirt 138 into duct 108. Insertion of piston skirt 138 into duct 108 in turn causes duct 108 to fluidly separate inlet 104 from outlet 106, substantially no compressed fluid 24 passing between inlet 104 and outlet 106 through duct 108. It is contemplated that piston 112 remain in abutment with closed seat 126 while differential pressure P1-P3 across bleed valve 100 remains above the predetermined value. In certain embodiments the predetermined value demarcates a transition between starting and steady-state operation of a compressor, e.g., compressor section 14 (shown in FIG. 1) of gas turbine engine 10 (shown in FIG. 1).

When the pressure differential drops below a predetermined value a piston 112 moves to an open position 116 (shown in FIG. 4), compressed fluid 24 flowing from plenum 30 to external environment 20 through a duct 108 within bleed valve 100. When the pressure differential rises above the predetermined value a piston 112 (shown in FIG. 3) moves to a closed position 118 (shown in FIG. 5), piston 112 blocking duct 108 such that duct 108 fluidly separates outlet 106 from inlet 104 and no compressed fluid 24 flows between inlet 104 and outlet 106 through duct 108. In both closed position 118 and open position 116, as well as positions intermediate closed position 118 and closed position 118, outlet 106 and inlet 104 are in fluid communication with one another through an piston orifice 114 extending through piston 112. In this respect piston orifice 114 and guide tube orifice 134 form an orifice network within bleed valve 100 for passive control of bleed valve 100. Piston orifice 114 and guide tube orifice 134 allow for pressure exerted on the downstream face of piston 112 (shown with P2 in FIG. 3) to vary according to inlet pressure P1 and outlet pressure P3. By selecting flow area of piston orifice 114, flow area of guide tube orifice 134, and force associated B associated with biasing member 148, piston 112 can passively controlled to move from open position 116 (shown in FIG. 4) and closed position 118 (shown in FIG. 5) when differential pressure P1-P3 reaches the predetermined value.

Figure 3C:
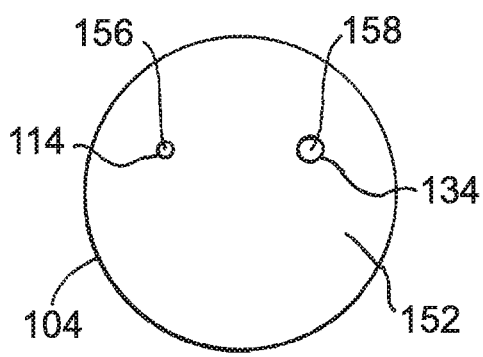
Figure 3B:
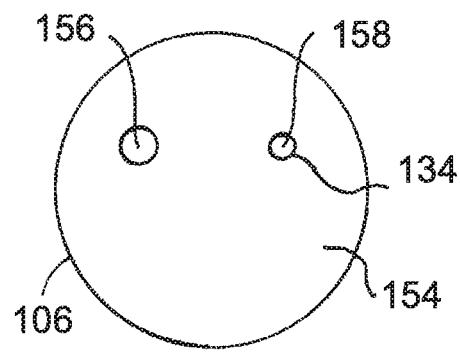

It is contemplated that bleed valve 100 have internal leakage, through piston orifice 114 and guide tube orifice 134, when piston 112 is in closed position 118 (shown in FIG. 5). It is also contemplated that flow areas of either (or both) piston orifice 114 and guide tube orifice 134 be relatively small compared to flow areas of inlet 104 and outlet 106 such that the leakage remain relatively small. For example, as shown in FIGS. 3B and 3C, in certain embodiments, a flow area 152 of inlet 104 and/or a flow area 154 of outlet 106 is an order of magnitude or greater than a flow area 156 of piston orifice 114 and/or a flow area 158 guide tube orifice 134. Such sizing renders the leakage through bleed valve 100 acceptable in certain compressor applications, such as in certain models of gas turbine engines.

Figure 6:
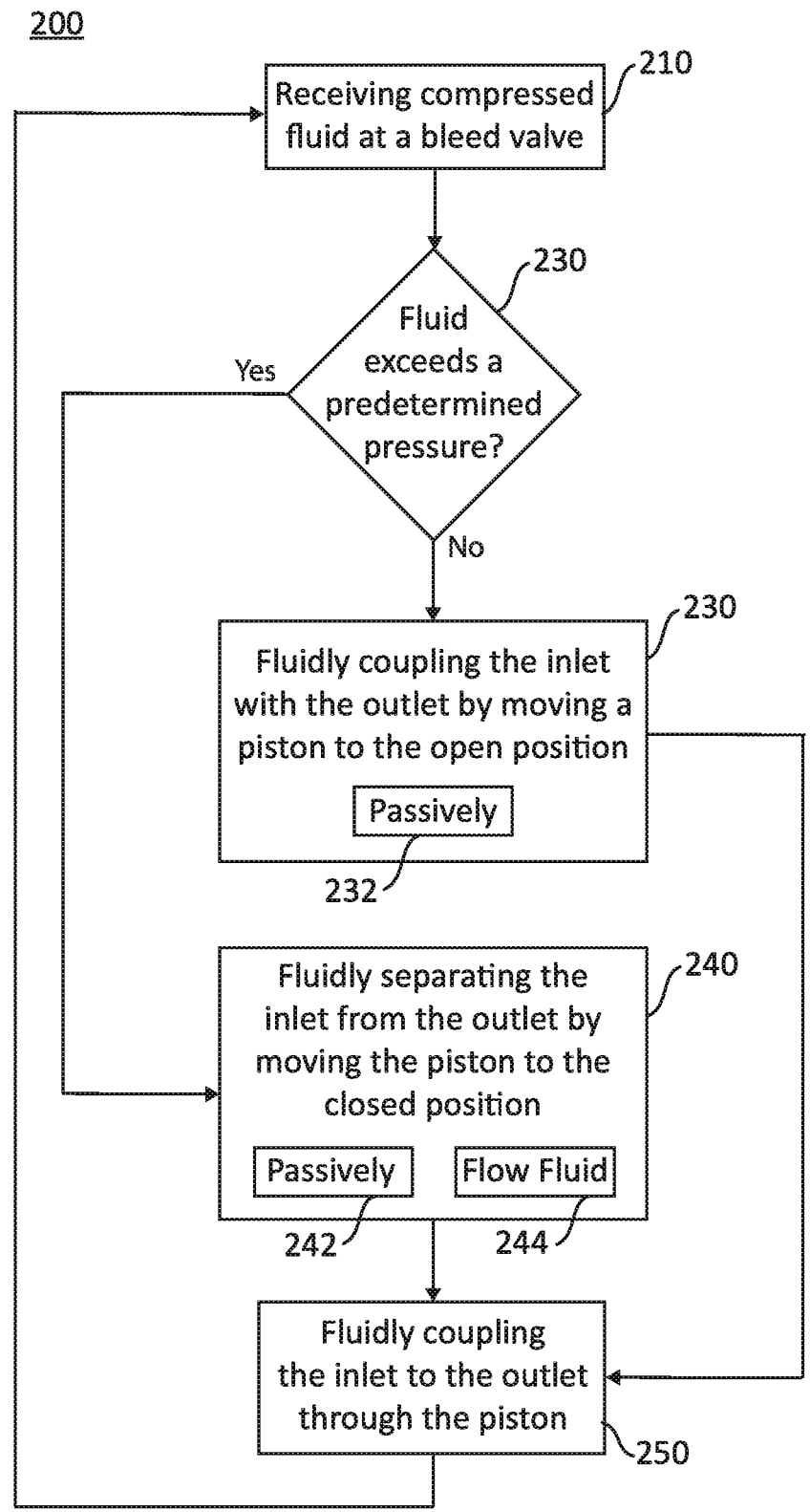
FIG. 6 is a method of controlling fluid flow through a bleed valve, showing operations for passively controlling fluid flow through the valve according to pressure differential between the bleed valve inlet and outlet.

Referring now to FIG. 6, method 200 of controlling fluid flow through a bleed valve, e.g., bleed valve 100 (shown in FIG. 3A), is shown. Method 200 includes receiving pressurized fluid at an inlet of the bleed valve, e.g., inlet 104 (shown in FIG. 3A), as shown with box 210. The bleed valve responds passively to differential in the pressure at the inlet and pressure at an outlet of the bleed valve, e.g., outlet 106 (shown in FIG. 3A), as shown with box 220. When the pressure differential is below a predetermined value the inlet is fluidly coupled to the outlet by a duct, e.g., duct 108 (shown in FIG. 3A), as shown with box 230. This can be done passively, as shown with box 232. The inlet can be fluidly coupled to the outlet by moving a piston, e.g., piston 112 (shown in FIG. 3A), to an open position, e.g., open position 116 (shown in FIG. 4), as also shown by box 230. The inlet is also in fluid communication with the outlet in the open position through the piston, e.g. through either (or both) piston orifice 112 (shown in FIG. 3A) and guide tube orifice 134 (shown in FIG. 3A), as shown with box 250.

When the pressure differential is above the a predetermined value the inlet is fluidly separated from the outlet by a duct, e.g., duct 108 (shown in FIG. 3A), as shown with box 240. This can be done passively, as shown with box 242. The inlet can be fluidly separated from the outlet by moving the piston, e.g., piston 112 (shown in FIG. 3A), to a closed position, e.g., closed position 118 (shown in FIG. 5), as also shown by box 250. When in the closed position the inlet is also in fluid communication with the outlet through the piston, e.g. through either (or both) piston orifice 112 (shown in FIG. 3A) and guide tube orifice 134 (shown in FIG. 3A), as shown with box 250. It is contemplated that fluid flow through the bleed valve when the piston is in the closed position, as shown with box 244.

Inline bleed valves for gas turbine engines are generally operated by a pneumatic controller. The pneumatic controller controls muscle pressure applied to the inline bleed valve for actuation of the bleed valve. While generally acceptable for their intended use actuate by compressed fluid can add complexity, mass, and/or size to the inline bleed valve.

In certain embodiments described herein a passive inline bleed valve is described which functions solely according to the pressure conditions present at the inlet and the outlet of the inline bleed valve. The inline bleed valve has an orifice network having at least two orifices defined within the inline bleed valve and fluidly between the inlet and the outlet. By selecting suitable sizing of the orifice flow area internal leakage through the inline bleed valve and pressure within chambers defined within the inline bleed valve interior can be controlled. In this respect pressure within a chamber located fluidly downstream of the inlet bleed valve piston can balance force on piston from pressure within a chamber located fluidly upstream of the inlet bleed valve piston. The net force on the piston is a function of the pressures on each side of the piston and pressure exerted on the piston by the biasing member, the amount of force exerted on the piston thus controlling the pressure at which the valve actuates.

The methods and systems of the present disclosure, as described above and shown in the drawings, provide for inline bleed valves with superior properties including passive control. Being passively controlled the inline bleed valves do not require an active control mechanism, such as a solenoid and/or a controller. This can reduce complexity, mass, and size of the bleed valve, potentially improving reliability and/or reducing cost. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A bleed valve, comprising:
a housing with an inlet, an outlet, and a duct coupling the inlet to the outlet;
a guide tube fixed within the housing between the inlet and the outlet; and
a piston, with a piston orifice, slideably supported on the guide tube and movable between an open position and a closed position, wherein the duct fluidly couples the inlet to the outlet in the open position, wherein the duct fluidly separates the inlet from the outlet in the closed position, and wherein the piston orifice fluidly couples the inlet with the outlet in the open position and the closed position to move the piston between the open position and the closed position according to differential in pressure between the inlet and the outlet of the bleed valve, further comprising a biasing member seated between the housing and the piston, the biasing member arranged to bias the piston towards the inlet.

2. The bleed valve of claim 1, wherein the piston orifice has a flow area that is smaller than a flow area of at least one of the inlet and the outlet.

3. The bleed valve of claim 1, wherein at least one of the inlet and the outlet has a flow area 20 greater than a flow area of the piston orifice by an order of magnitude or greater.

4. The bleed valve of claim 1, wherein the guide tube has a guide tube orifice in fluid communication with the piston orifice.

5. The bleed valve of claim 1, wherein the housing comprises an inlet portion and an outlet portion, the inlet portion defining the inlet, the outlet portion defining the outlet, and the inlet portion sealably connected to the outlet portion.

6. The bleed valve of claim 1, wherein the housing has an open seat and a closed seat, the piston seating against the open seat in the open position, the piston seating against the closed seat in the closed position.

7. The bleed valve of claim 1, further comprising an inner sealing ring disposed between the piston and the housing, the inner sealing ring arranged between the guide tube and the piston.

8. The bleed valve of claim 1, further comprising an outer sealing ring disposed between the housing and the piston, the outer sealing ring arranged on a side of the piston opposite the guide tube.

9. A compressor, comprising:
a plenum; and
a bleed valve as recited in claim 1 coupled to the plenum, the housing arranged in series between the plenum and an external environment such that the differential pressure between the plenum and a bleed valve outlet passively controls movement of the piston between the open position and an outlet position.

10. A gas turbine engine, comprising:
a compressor with a plenum;
a turbine operably connected to the compressor; and
a bleed valve as recited in claim 1 coupling the plenum with an external environment, wherein flow area of the piston orifice is smaller than flow areas of the inlet and the outlet such that the piston remains in the open position during engine starting and remains in the closed position during engine steady state operation.

11. A bleed valve, comprising:
a housing with an inlet, an outlet, and a duct coupling the inlet to the outlet;
a guide tube fixed within the housing between the inlet and the outlet; and
a piston, with a piston orifice, slideably supported on the guide tube and movable between an open position and a closed position, wherein the duct fluidly couples the inlet to the outlet in the open position, wherein the duct fluidly separates the inlet from the outlet in the closed position, and wherein the piston orifice fluidly couples the inlet with the outlet in the open position and the closed position to move the piston between the open position and the closed position according to differential in pressure between the inlet and the outlet of the bleed valve wherein the guide tube has a guide tube orifice in fluid communication with the piston orifice, wherein the guide tube orifice is in fluid communication with the outlet when the piston is in both the open position and the closed position, wherein the guide tube orifice is downstream of the piston orifice.

12. The bleed valve of claim 11, wherein the guide tube orifice is in fluid communication with the inlet when the piston is in both the open position and the closed position.

13. The bleed valve of claim 11, wherein the guide tube orifice has a flow area that is smaller than a flow area of at least one of the inlet and the outlet.

14. The bleed valve of claim 11, wherein at least one of the inlet and the outlet has a flow area greater than a flow area of the guide tube orifice by an order of magnitude or greater.

15. A bleed valve, comprising:
a housing with an inlet, an outlet, and a duct coupling the inlet to the outlet;
a guide tube fixed within the housing between the inlet and the outlet; and
a piston, with a piston orifice, slideably supported on the guide tube and movable between an open position and a closed position, wherein the duct fluidly couples the inlet to the outlet in the open position, wherein the duct fluidly separates the inlet from the outlet in the closed position, and wherein the piston orifice fluidly couples the inlet with the outlet in the open position and the closed position to move the piston between the open position and the closed position according to differential in pressure between the inlet and the outlet of the bleed valve, wherein the piston has a face portion and a skirt portion, the piston face portion opposing the inlet, the skirt portion extending from the face portion towards the outlet, the piston orifice extending through the piston face portion, wherein the face portion is an upstream most portion of the piston.

16. A method of controlling fluid flow through a bleed valve, the bleed valve comprising: a housing with an inlet, an outlet, and a duct coupling the inlet to the outlet; a guide tube fixed within the housing between the inlet and the outlet; and a piston, with a piston orifice, slideably supported on the guide tube and movable between an open position and a closed position, wherein the duct fluidly couples the inlet to the outlet in the open position, wherein the duct fluidly separates the inlet from the outlet in the closed position, and wherein the piston orifice fluidly couples the inlet with the outlet in the open position and the closed position to move the piston between the open position and the closed position according to differential in pressure between the inlet and the outlet of the bleed valve, further comprising a biasing member seated between the housing and the piston, the biasing member arranged to bias the piston towards the inlet, the method comprising: fluidly coupling the inlet to the outlet with the duct by moving the piston to the open position; and fluidly separating the inlet from the outlet by moving the piston to the closed position, wherein the inlet is in fluid communication with the outlet through the piston orifice when the piston is in the open and the closed position.

17. The method as recited in claim 16, further comprising passively moving the piston to the closed position when the differential in pressure between the inlet and the outlet exceeds a predetermined value.

18. The method as recited in claim 16, further comprising passively moving the piston to the open position when the differential in pressure between the inlet and the outlet is below a predetermined value.

19. The method as recited in claim 16, further comprising flowing the fluid flow through the bleed valve with the piston in the closed position.

* * * * *